United States Patent

[11] 3,547,208

[72] Inventors James C. Swain
Columbus;
David L. Thomas, Columbus; John L.
Nagely, Sidney, Ohio
[21] Appl. No. 730,155
[22] Filed May 17, 1968
[45] Patented Dec. 15, 1970
[73] Assignee Westinghouse Air Brake Company
Wilmerding, Pa.
a corporation of Pennsylvania

[54] PERCUSSIVE TOOL
19 Claims, 3 Drawing Figs.
[52] U.S. Cl. .................................. 173/136,
173/139
[51] Int. Cl. .................................. B25d 9/00
[50] Field of Search .......................... 173/80,
139, 136; 175/213

[56] References Cited
UNITED STATES PATENTS
2,019,332 10/1935 Atkins ........................ 175/213
2,536,971 1/1951 Weyandt et al. ............... 173/105
2,628,599 2/1953 Wilson et al. ................. 173/139
3,179,185 4/1965 O'Farrell ..................... 173/139
3,250,335 5/1966 Joelson ....................... 173/139
FOREIGN PATENTS
319,179 1929 Great Britain ............... 175/213
176,195 1953 Austria ...................... 175/213

Primary Examiner—James A. Leppink
Attorney—Lieber & Nilles

ABSTRACT: A percussive rock drilling device operable by fluid pressure and having a striker element for imparting blows to a drill steel chuck, the striker being provided with cushioning means for absorbing shock in the event of overtravel and the chuck being supported for reciprocation and rotation on bearings which are protectively isolated outside of a dust evacuation zone.

PATENTED DEC 15 1970

Inventors
J. C. Swain
D. L. Thomas
J. L. Nagely
By
Lieber & Niller
Attorney

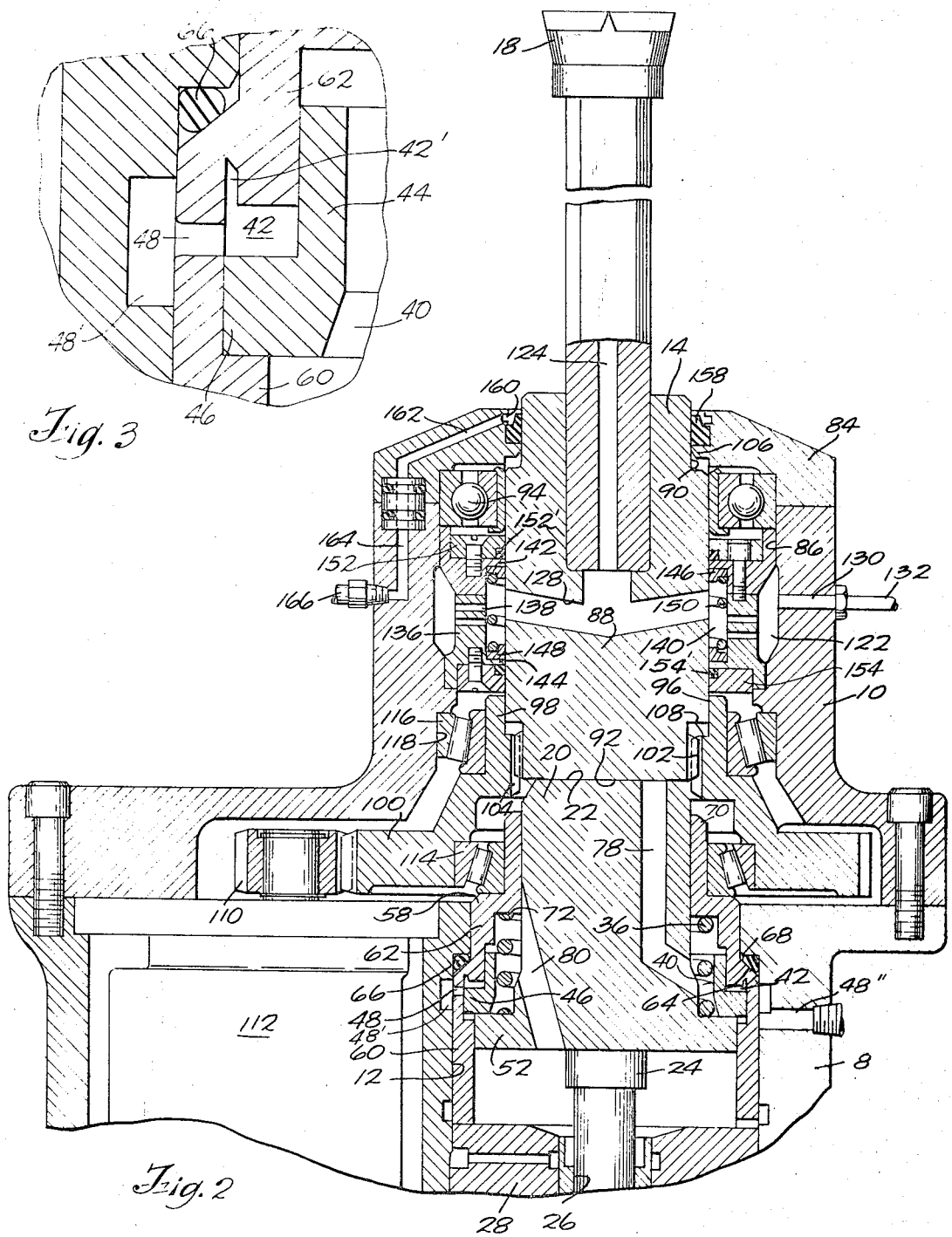

3,547,208

PERCUSSIVE TOOL

BACKGROUND

In the drilling of rock and ore, it is customary to employ percussive drilling tools which utilize pressurized fluid for delivering a succession of impact blows to a striking element. In most cases, these devices have heretofore used pneumatic motors operable by compressed air as the power source. However, more recently, it has been proposed to use percussive drills powered by hydraulic fluid under pressure and acting on a reciprocating piston to motivate the striker.

In these devices, it has also been proposed to provide means for imparting rotation to the drill steel chuck as the percussive blows are delivered, such rotation being effected by various means. By way of example, one such means for rotating the drill steel chuck during percussive operation utilizes a rotary motor powered by pressurized fluid as is the reciprocating motor. This requires that the drill steel chuck be supported for both reciprocating and rotational movement.

Since the impact blows imparted to the striker in these drills are necessarily at high velocity in order to perform the required work, considerable shock is encountered during reciprocation thereof, particularly when the drill steel is running loose or free and the striker tends to overtravel. Also, as the drill steel performs its work, much dust is conveyed through the area of the drill steel chuck, and this dust is extremely harmful to the chuck bearings and other operating parts. In addition, any improper or inaccurate balancing or alignment of parts leads to excessive wear and costly maintenance.

SUMMARY

It is therefore an object of the present invention to provide an improved percussive rock drill for either stoper or horizontal drilling which obviates the aforesaid disadvantages and objections attendant prior devices of this general type.

Another object of this invention is to provide a percussive drilling tool which embodies highly effective shock cushioning and snubbing means for absorbing and minimizing shock resulting from overtravel of the striker element.

Still another object of the invention is to provide a fluid actuated percussive drill wherein the drill steel chuck is mounted for rotation as well as reciprocation in a highly efficient bearing assemblage which is effectively protected from dust and other foreign matter.

A further object of the present invention is to provide a fluid actuated percussive drill having an annular dust collecting chamber surrounding the drill steel chuck, the chamber being effectively sealed from the bearings and operating parts of the apparatus and being subjected to suitable vacuum for evacuating the dust therefrom.

An additional object of the invention is to provide a percussive rock drill operable by pressurized fluid and having a striker piston assembly which is self-centering and which includes a snubber piston cushioned by regulated fluid pressure for absorbing shocks upon overtravel of the striker piston.

These and other objects and advantages of the invention will become apparent from the following detailed description.

THE DRAWINGS

A clear conception of the several features constituting the present invention and of the mode of constructing and utilizing a typical hydraulic stoper type drill embodying the improvements may be had by referring to the drawings accompanying and forming a part of this specification, wherein like reference characters designate the same or similar parts in the various views.

FIG. 2 is a similar sectional view through the drill but showing the striker piston advanced to its extended impacting position; and FIG. 3 is a somewhat enlarged fragmentary sectional view of the valving arrangement for the snubber piston.

DETAILED DESCRIPTION

Figure 1:
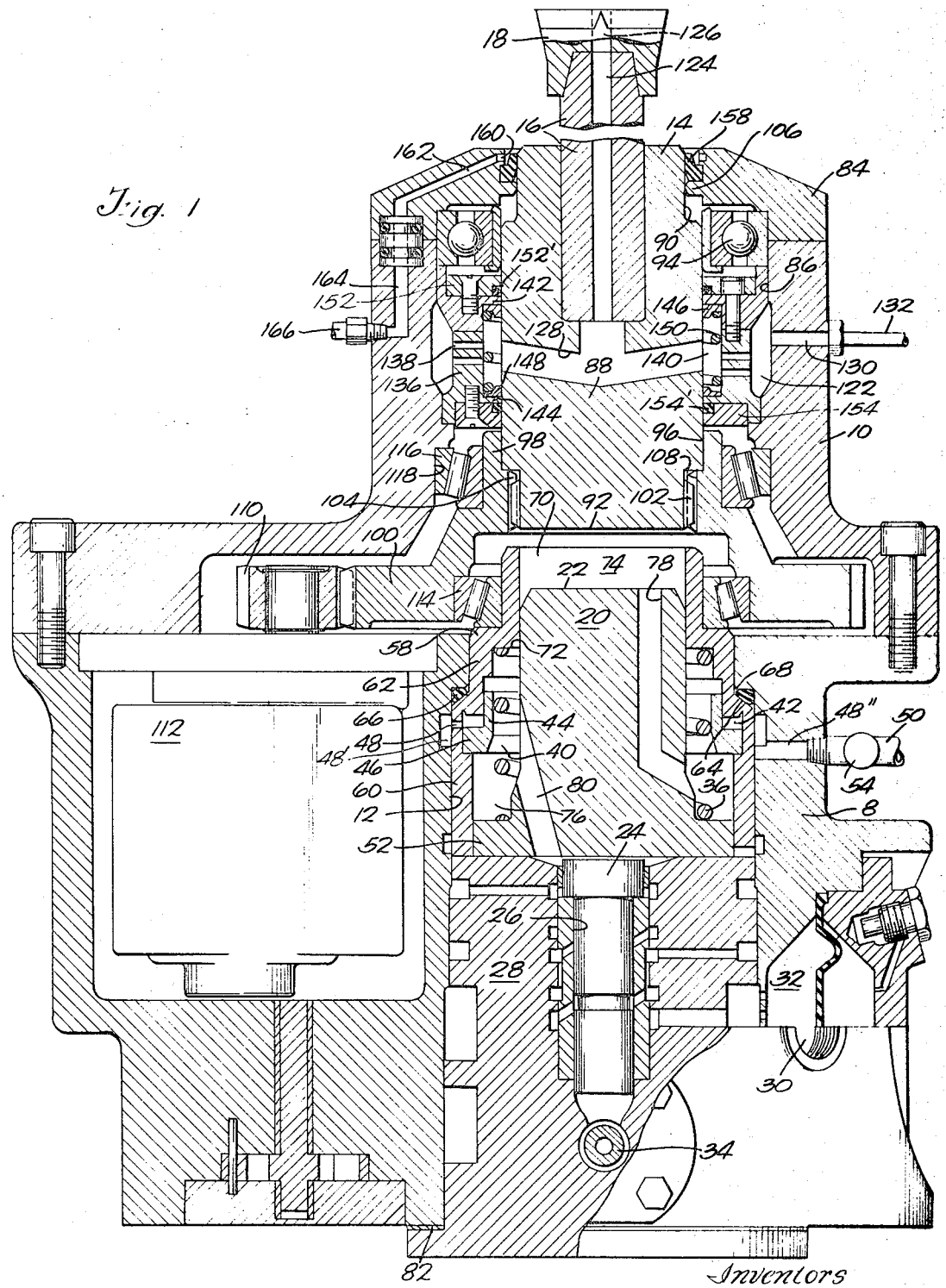
FIG. 1 is a transverse vertical section through a typical hydraulically operated stoper drill embodying the invention and showing the striker piston in its retracted position.

Referring to the drawings, the improvements constituting the present invention are shown therein as embodied in a hydraulically operable rotary-percussive drill of the stoper type such as fully disclosed in U.S. Pat. No. 3,230,711, dated Jan. 25, 1966 to James C. Swain, et al. and entitled Hydraulic Motor Means. Reference may therefore be made to such prior patent for a more detailed description of the operation and control of the drill motor and its attendant parts as well as the hydraulic system per se.

Generally, the assemblage shown herein comprises a housing having its rear or lower portion 8 provided with a bore 12 extending therethrough. Slidably and rotatably confined in the front or upper portion 10 of the housing in axial alignment with the bore 12 is a chuck 14 carrying a drill steel 16 having a work performing bit 18. A striker piston 20 is mounted for reciprocatory movement within the bore 12 of the housing portion 8 so that the front end 22 thereof will contact the adjacent end of the drill steel chuck 14 upon movement of the striker 20 in one direction. Suitable means is also provided for reciprocating the striker 20 to impart a succession of blows to the chuck 14 to thereby percussively actuate the same.

As shown and described in detail in the aforesaid U.S. Pat. No. 3,230,711, the means for driving the striker 20 toward and into contact with the chuck 14 may comprise a hydraulically actuated impact piston 24 slidably carried in the bore 26 of a cylindrical housing 28 closing the rear end of the bore 12. The impact piston 24 is disposed concentric with the striker 20 and is actuated by pressurized hydraulic fluid conducted thereto from a suitable supply source via inlet 30 past an accumulator 32 under the control of a reciprocating spool type valve 34. In operation, the impact piston 24 is accordingly reciprocated and on its forward motion, drive the striker 20 toward the chuck 14, the striker being returnable after each forward stroke as by means of a spring 36.

Thus, a succession of percussive blows are imparted to the chuck 14 in normal operation, and as long as the drill bit 18 is firmly held against the work, the blows delivered by the striker 20 are transmitted by the chuck 14 to drill 16. However, should the drill bit encounter an extremely soft or hollow spot or be permitted to run free, the striker 20 will overtravel on its forward stroke, and due to the high velocity of movement, extreme shocks will result along with the possible serious damage to the device. One feature of this invention is to provide an improved means for absorbing these shocks and for cushioning the parts during such abnormal operation.

For this purpose, an annular member 40 is provided, The member 40 being slidably confined within a sleeve 58 in the bore 12 for independent movement within predetermined limits as defined by an annular chamber 42. The member 40 is in the nature of a hollow piston having a cylindrical guide portion 44 and an outwardly extending annular flange 46 received within the chamber 42. The chamber 42 is pressurized by hydraulic fluid admitted thereto above or on the forward side of the piston flange 46 via port 48, annulus 48', and port 48'' which communicates with a suitable supply source, not shown, as through a hose or supply conduit 50. As shown, the striker 20 is provided with an annular flange 52 or similar portion cooperable with the rear of the annular member 40 upon overtravel of the striker, and the impacts of the striker on its forward stroke are thereby absorbed by the member 40 acting as a snubber piston (see FIG. 2). Proper pressure may be conveniently maintained in the chamber 42 and the supply line leading thereto as through use of a pressure regulator and/or accumulator 54 to provide for the correct snubbing action and return of the snubber piston as hereinafter more fully described.

For the purposes of properly centering and guiding the striker 20 and snubber piston 40 and for additionally cushioning against shocks while also permitting the provision of an efficient seal, the stroker, its snubber piston and its return spring are all housed as a unit in a single shell or sleeve 58. As shown, the sleeve 58 has a cylindrical rear portion 60 of largest diameter received in the bore 12 with the annular flange 52 of the striker 20 slidable therein, the annular chamber 42 being formed in the forward end of the portion 60 for slidably receiving the flange 46 of the snubber piston 40. The intermediate cylindrical portion 62 of the sleeve member 58 is of somewhat reduced diameter, and the sleeve portions 60 and 62 are joined by an outer annular shoulder or flange 64 which is tapered as shown for seating against a resilient O-ring 66 seated and retained against displacement on an annular shoulder 68 formed within the bore 12. The forward cylindrical end portion 70 of the sleeve member 58 is of still further reduced diameter with the forward end of the striker piston 20 being guided in its movement within the portion 70.

Thus, the sleeve 58 provides a unitary housing for the striker piston 20 and snubber piston 40 both of which are guided and retained concentric within the sleeve. The spring 36 is compressed between the flange 52 of the striker 20 and the inner shoulder 72 formed between the end portion 70 and intermediate portion 62 of the sleeve 58 and thereby acts to return the striker 20 after each forward stroke thereof. In actual practice, shims 82 are utilized between the flange of housing 28 and the adjacent end of housing 8 to firmly seat the housing 28 and sleeve 58, and the O-ring 66 functions both as a seal and as a resilient member to cushion shocks transmitted through deflection of the tapered sleeve portion 64 in the event of overtravel. To provide against oil buildup in the chambers 74, 76 and insure free movement of the striker 20 responsive to the action of the impact piston 24 and spring 36, the striker 20 is provided with ports 78, 80 respectively.

In addition to being mounted for percussive action, the chuck 14 is also mounted for selective rotary motion within a bore 86 formed in the front or upper housing portion 10 which is closed by cap 84, the chuck being axially aligned with the bore 12, sleeve 58 and striker 20. As shown, the chuck 14 is formed with a cylindrical body portion 88 of somewhat enlarged diameter intermediate the front and rear ends 90, 92 respectively. Adjacent the forward end 90, the body portion 88 of the chuck is supported for both reciprocatory and rotary motion in the inner race of a bearing 94 mounted in the bore 86. The opposite end of the body portion 88 is slidably received in a cylindrical portion 96 which is formed in the hub 98 of a gear 100, the adjacent reduced end 92 of the chuck having splines 102 received in grooves 104 in the hub 98 for permitting axial movement of the chuck 14. The chuck 14 is accordingly free to move axially within limits defined by the inwardly projecting flange or shoulder 106 at the forward end of the housing 84 and the shoulder 108 formed in the gear hub 98 between which the body portion 88 is confined.

The gear 100 meshes with a gear 110 which is driven by a suitable fluid motor 112 under the control of an operator to thereby selectively rotate the chuck 14 through its spline connection 102, 104, the gear 100 being mounted for rotation on a bearing 114 having its inner race carried by the reduced forward portion 70 of the sleeve 58. The hub 98 of gear 100 also has a bearing 116 mounted thereon, the outer race of which is seated within a cylindrical portion 118 of the bore 86. Thus, the gear 100 and chuck 14 are centered with respect to the sleeve 58, striker 20 and bore 86, and the chuck 14 is rendered freely axially movable within predefined limits for percussive action while also being rotatable.

As the bit 18 performs its work during drilling, considerable abrasive dust or cutting fines are created, and the operating parts exposed thereto are subject to extensive abuse unless adequately protected. In the present instance, this dust is collected and removed in a highly efficient manner and the bearings and operating parts are maintained relatively dust free. This is accomplished by providing an annular space or chamber 122 within the bore 86 surrounding the medial body portion 88 of the chuck 14 and establishing a low pressure condition in the chamber to evacuate the same. The chamber 122 is placed in communication with the work by providing axially aligned passageways 124, 126 in the drill steel 16 and bit 18 respectively, the passageway 124 communicating at its inner end with the annular chamber 122 via one or more passageways 128 formed in the chuck 14. In turn, the annular chamber 122 may be connected to a suitable source of vacuum through port 130 and tube or hose 132. Dust is thereby drawn through the passageways 124, 126, 128 and into the chamber 122 from which the collected dust is evacuated through port 130 and hose 132.

The bearings 94 and 116 are sealed from the dust collection chamber 122 by an annular spacer member 136 spanning the chamber 122 and provided with ports 138 extending therethrough. The spacer 136 is formed with a medial portion 140 of increased diameter bounded at opposite ends by inwardly directed annular flanges or shoulders 142, 144. Seated on these flanges 142, 144 are a pair of annular rings 146, 148 respectively, and these rings or primary seals are constantly urged toward their respective seats by a spring 150 compressed therebetween within the annular area 140. In addition, annular sealing members 152, 154 are secured to the opposite ends of the spacer 136, and these members are provided with suitable or final seals 152', 154' respectively. Thus, the bearings 94 and 116 are both confined within areas sealed from the annular dust collection chamber 122.

While this sealing arrangement has been shown and described herein as being especially adapted for and utilized with a vacuum system wherein the abrasive fines are evacuated from the annular area 140 through ports 138, collection chamber 122 and port 130 by low pressure air, the seal arrangement is such that it is also effectively usable in a pressure system wherein a pressurized fluid, either air or water, is used to blow the dust and cuttings away from the bit. In other words, pressurized fluid may be supplied via pipe 132, and the flow through the chamber 122, ports 138, space 140, and passages 128, 124 and 126 is then reversed from that hereinabove described.

The drill steel chuck 14 is protectively sealed at its exposed forward end by an annular seal 158 embracing and wiping over the reduced end portion 90 as the chuck 14 is operated. However, the sealing effect of the member 158 is preferably augmented by subjecting the area surrounding the exposed end of the chuck to a ring of pressurized air. For this purpose, an annular groove 160 opening inwardly toward the seal 158 and the adjacent end of the chuck 14 is formed in the housing portion 84, and this groove is placed in communication with a suitable external pressure source via passageway 162, 164 and hose 166. Thus, by supplying pressurized air or the like to the annular groove 160, the area entirely surrounding the seal 158 and end of the chuck is kept relatively clean.

Returning now to the snubbing arrangement operative upon overtravel of the striker as hereinabove described, it should be noted that the hydraulic fluid in chamber 42 increases in pressure as the piston 40 is deflected by the striker overtravel impact, such action being due to the fact that the ports 48 and 48'' are sized to act as a variable restriction to the hydraulic fluid being displaced from the chamber 42. Thus, as flange 46 of the snubber piston 40 is moved upon impact, it progressively covers a portion of the ports 48, and while the annular piston 40 initially moves at striker impact velocity, pressure buildup occurs in chamber 42 commensurate with the velocity, piston area and orifice area to retard movement of the snubber, piston and striker 20. As the striker is thus slowed or retarded in its movement, the orifice area decrease should be such as to maintain essentially constant retarding pressure in the chamber 42, and the proper pressure may be maintained as hereinabove described through use of a pressure regulator and/or accumulator 54.

In order to return the piston 40 to its initial position, as shown in FIG. 1, after snubbing the striker 20, it is important that the pressure and the orifice area relationship be such as to return the piston gradually and over a time interval sufficient to reposition the same in readiness for snubbing overtravel on the next stroke of the striker but without shock and creation of excessive stresses. Accordingly, in order to reduce the velocity at which the snubbing piston 40 is returned to its initial position to thereby eliminate excessively high impact stresses, the snubber supply pressure annulus 48' should be in unrestricted communication with the port 48, and the entrance or mouth portion of the port 48 should preferably be formed with a radius so as to improve inflow of oil. In addition, it has been found preferable to undercut an annular area at the forward end of the chamber 42 as at 42' for absorbing the initial pressure force for the start of the repositioning movement of the snubber piston, such arrangement being more clearly shown in the enlarged fragmentary sectional view of FIG. 3.

Various modes of carrying out the invention are contemplated as being within the scope of the following claims particularly pointing out and distinctly claiming the subject matter which is regarded as the invention.

We claim:

1. In a percussive drill, a housing having a bore, a drill steel chuck at one end of said housing in axial alignment with the bore thereof, a striker slidably mounted within the bore of said housing, means for reciprocating said striker to impart a succession of blows to said chuck, an annular member surrounding said striker and independently slidable within predetermined limits in the bore of said housing and in sealing engagement with said bore, said striker having a portion cooperable with one side of said annular member upon movement of said striker beyond its normal stroke in one direction, and fluid pressure means for constantly urging said annular member in the opposite direction upon predetermined fluid pressure to cause said member to resist further movement of said striker in said one direction.

2. A percussive drill according to claim 1, wherein the annular member is slidably confined in a separate annular chamber within the bore of the housing.

3. A percussive drill according to claim 2, wherein the annular chamber is pressurized by hydraulic fluid to constantly urge the annular member in the direction causing said member to resist movement of the striker beyond its normal stroke, and means is provided for varying the pressure in said chamber and resistance to movement of said striker in response to movement of said annular member.

4. A percussive drill according to claim 3, wherein a pressure regulator is provided for controlling the pressure of the hydraulic fluid in the annular chamber.

5. A percussive drill according to claim 1, wherein the striker has an annular flange which forms the portion which is cooperable with one side of the annular member upon the movement of the striker beyond its normal stroke.

6. A percussive drill according to claim 1, wherein a guide sleeve is housed within the bore of the housing, and said guide sleeve has cylindrical portions cooperable with the striker and with the annular member for guiding the same in their movement.

7. A percussive drill according to claim 6, wherein spring means between the guide sleeve and the striker constantly urges said striker away from the chuck.

8. A percussive drill according to claim 7, wherein fluid under pressure between the guide sleeve and the annular member constantly urges said annular member in a direction away from the chuck.

9. A percussive drill according to claim 6, wherein means is provided for centering the guide sleeve within the bore of the housing and for absorbing shock upon movement of the striker beyond its normal stroke.

10. A percussive drill according to claim 6, wherein the bore of the housing is formed with an annular shoulder on which is seated a resilient ring and the guide sleeve is provided with an annular flange seated against said resilient ring.

11. A percussive drill according to claim 10, wherein the annular flange on the guide sleeve is tapered and the resilient ring is an O-ring compressed between the shoulder of the bore and the tapered flange.

12. A percussive drill according to claim 6, wherein the bore of the housing is formed with an annular shoulder on which is seated a resilient O-ring, the guide sleeve being formed with an annular tapered flange seated against said O-ring, and spring means is interposed between the guide sleeve and the striker for constantly urging said striker away from the chuck.

13. A percussive drill according to claim 1, wherein the chuck is surrounded by an annular chamber, and means is provided for communicating the chamber with a source of low pressure.

14. A percussive drill according to claim 13, wherein the chuck is mounted for both axial and rotational movement in bearings spaced at opposite ends of the annular chamber.

15. In a percussive drill, a housing having a bore, a drill steel chuck at one end of said housing in axial alignment with the bore thereof, means defining an annular space surrounding said chuck, means for imparting a succession of blows to said chuck for percussive operation thereof, means connecting the annular space with a source of vacuum to establish and maintain a reduced pressure condition within the space and thereby remove dust therefrom, primary sealing rings surrounding the chuck at the opposite ends of the annular space, and spring means interposed between said primary sealing rings for constantly resiliently urging said rings away from each other and toward seated condition.

16. A percussive drill according to claim 15, wherein the drill steel chuck is provided with a passageway constantly communicating the working end of a drill steel carried thereby with the annular space surrounding the chuck.

17. A percussive drill according to claim 16, wherein means is also provided for rotating the chuck during the percussive operation thereof.

18. A percussive drill according to claim 15, wherein the chuck is rotatably mounted on bearings located beyond each of the primary sealing rings on the sides thereof remote from the annular space, and secondary sealing members are provided between each of the bearings and the respective primary sealing rings.

19. A percussive drill according to claim 15, wherein means are provided for conducting pressurized fluid to the end of the housing entirely about the outer end of the drill steel chuck.